US012606033B2

(12) United States Patent
Larsson et al.

(10) Patent No.: US 12,606,033 B2
(45) Date of Patent: Apr. 21, 2026

(54) POWER GENERATING ARRANGEMENT

(71) Applicant: Volvo Construction Equipment AB, Eskilstuna (SE)

(72) Inventors: Fredrik Larsson, Vellinge (SE); Fredrik Rahm, Hörby (SE)

(73) Assignee: Volvo Construction Equipment AB, Eskilstuna (SE)

( * ) Notice: Subject to any disclaimer, the term of this patent is extended or adjusted under 35 U.S.C. 154(b) by 326 days.

(21) Appl. No.: 18/398,975

(22) Filed: Dec. 28, 2023

(65) Prior Publication Data

US 2024/0227584 A1 Jul. 11, 2024

(30) Foreign Application Priority Data

Jan. 9, 2023 (EP) ..................................... 23150728

(51) Int. Cl.
 *B60L 50/72* (2019.01)
 *B60K 1/04* (2019.01)
 *B60L 50/71* (2019.01)

(52) U.S. Cl.
 CPC ................ *B60L 50/72* (2019.02); *B60K 1/04* (2013.01); *B60L 50/71* (2019.02)

(58) Field of Classification Search
 CPC ........... B60L 50/72; B60L 50/71; B60K 1/04; H01M 8/2475
 See application file for complete search history.

(56) References Cited

U.S. PATENT DOCUMENTS

| | | | |
|---|---|---|---|
| 5,202,695 A | 4/1993 | Hollandsworth et al. |
| 8,469,127 B2 | 6/2013 | Tarasinski et al. |
| 10,281,930 B2 | 5/2019 | Hutson |
| 2017/0101031 A1 | 4/2017 | Ohashi |
| 2017/0256762 A1 | 9/2017 | Naito |
| 2017/0302852 A1 | 10/2017 | Lam |
| 2021/0257647 A1 | 8/2021 | Ohhashi et al. |
| 2022/0185089 A1 | 6/2022 | Hendriks et al. |
| 2022/0289013 A1 | 9/2022 | Naito et al. |

FOREIGN PATENT DOCUMENTS

| | | |
|---|---|---|
| CN | 216610861 U | 5/2022 |
| DE | 102020203490 A1 | 9/2021 |
| JP | 2008055972 A | 3/2008 |

OTHER PUBLICATIONS

Extended European Search Report for EP Patent Application No. 23150728.6, mailed Jun. 13, 2023, 7 pages.

*Primary Examiner* — Timothy Hannon
(74) *Attorney, Agent, or Firm* — Sage Patent Group

(57) ABSTRACT

A power generating arrangement, including a power generator, a housing and a supporting structure, wherein the housing is attached to the supporting structure, and a center of gravity of the power generator is arranged between at least one of a first and second geometric rotation axes and a downward facing side of the housing.

14 Claims, 6 Drawing Sheets

POWER GENERATING ARRANGEMENT

CROSS REFERENCE TO RELATED APPLICATION

This application claims priority to European Patent Application Number 23150728.6, filed on Jan. 9, 2023, the disclosure and content of which is incorporated by reference herein in its entirety.

TECHNICAL FIELD

The disclosure relates generally to power generating of vehicles. In particular aspects, the disclosure relates to a power generating arrangement. The disclosure can be applied in heavy-duty vehicles, such as trucks, buses, and construction equipment. Although the disclosure may be described with respect to a particular vehicle, the disclosure is not restricted to any particular vehicle.

BACKGROUND

In order to reduce environmentally harmful exhaust gases for vehicles, electric traction motors are becoming increasing popular. In order to increase a range of operation for the electric machines, a high-voltage battery may not be sufficient and other power generating arrangements are developed and implemented. According to an example, fuel cells are developed to generate electric power during operation, with which electric power can be fed to the high-voltage battery or directly fed to the electric traction motor.

However, the power generator may need to be positioned at a certain position in order operate at its full potential. Since vehicles may be operated in relatively harsh environments from time to time the relative position in relation to a gravitational direction of the power generator may vary during operation of the vehicle. There is thus a desire to provide a solution that improves the operational capacity of the power generator in this sense.

SUMMARY

According to a first aspect of the disclosure, there is provided a power generating arrangement for a vehicle, the power generating arrangement comprising a power generator configured to contain a fluid in liquid, humid and/or moisturized form, a housing comprising an upward facing side and a downward facing side, wherein the power generator is arranged in the housing, the housing comprising an outlet configured to drain the fluid, wherein the outlet is arranged at the downward facing side, and a supporting structure comprising a first pivot joint rotatable about a first geometric rotation axis, and a second pivot joint rotatable about a second geometric rotation axis, wherein the first and second geometric rotation axes are non-parallel to each other, the supporting structure being connectable to a frame structure of the vehicle at the first pivot joint, wherein the housing is rotatably connected to the supporting structure, and wherein a center of gravity of the power generator is arranged between at least one of the first and second geometric rotation axes and the downward facing side of the housing.

The first aspect of the disclosure may seek to arrange the power generating arrangement in a substantially horizontal position irrespective of an inclination of the vehicle to which the power generating arrangement is mounted. A technical benefit may include that any potential fluid arranged in the power generator is maintained at a bottom side, thereby reducing the risk of soaking components of the power generator that may be sensitive to interaction with fluids. Also, when fluid is located at an undesirable position within the power generator, there is a risk that components in need of fluid interaction may dry out. The first aspect of the disclosure may thus advantageously mitigate this potential problem. As a result, the operational capacity of the power generator can be maintained.

Further, providing a first pivot joint and a second pivot joint to define a respective first and second geometric rotation axis which are non-parallel to each other, the supporting structure may be arranged horizontal for substantially any inclination direction of the vehicle during operation. Moreover, by arranging the center of gravity of the power generator between at least one of the first and second geometric rotation axes and the downward facing side of the housing, i.e. below at least one of the first and second geometric rotation axes, a passive levelling of the power generator may be obtained.

The wording "power generator" should be construed as an arrangement configured to generate power. As will be described in further detail below, the power generator may be a fuel cell. The power generator preferably contains a fluid in liquid, humid and/or moisturized form, i.e. the state of the fluid is preferably one of liquid, humid or moisture. The power generator may thus alternatively, or additionally, be a piston engine in which e.g. a lubricant is arranged at a bottom end, and where it may be vital to keep the lubricant at the bottom end for obtaining sufficient lubrication of components forming part of the piston engine.

In some examples, the first and second geometric rotation axes may define a geometric plane, the center of gravity of the power generator arrangement being arranged between the geometric plane and the downward facing side of the housing. A technical advantage may be that a further improved passive levelling of the power generator may be obtained. By arranging the center of gravity below geometric plane, potential oscillations caused by sudden vehicle motions can also be reduced compared to positioning the center of gravity above the geometric plane.

In some examples, the supporting structure may comprise a first supporting portion and a second supporting portion, the second supporting portion being arranged between the housing and the first supporting portion. A technical advantage may be that the freedom to rotate the housing may be increased.

In some examples, the first pivot joint may be arranged on the first supporting portion, such that the first supporting portion is rotatably connectable to the frame structure of the vehicle.

In some examples, the second pivot joint may rotatably connect the second supporting portion to the first supporting portion about the second geometric rotation axis.

In some examples, the housing may be rotatably connected to the second supporting portion about the first geometric rotation axis.

In some examples, the first pivot joint may comprise a first bearing and the second pivot joint comprises a second bearing.

In some examples, the power generating arrangement may further comprise an actuator arrangement configured to control a rotation of the supporting structure about at least one of the first and second geometric rotation axes. A technical advantage may be that the actuator can enable for an active levelling of the power generator. Accordingly, and in some examples, the actuator arrangement may comprise a first actuator configured to control a rotation of the supporting structure about the first geometric rotation axis. A technical advantage may be that the first actuator can control a rotation around the first geometric axis.

In some examples, the first actuator may be arranged on the supporting structure at an opposite position compared to the first pivot joint and aligns with the first geometric rotation axis.

In some examples, the first actuator may be arranged at a first actuator position of the supporting structure, wherein the power generating arrangement further comprises a first actuator bearing configured to suspend the supporting structure at the first actuator position. A technical advantage may be that the first actuator bearing can enable for a sufficient and improved rotational functionality of the power generator by the first actuator.

In some examples, the actuator arrangement may comprise a second actuator configured to control a rotation of the supporting structure about the second geometric axis. A technical advantage may be that the actuator can enable for an active levelling of the power generator also by a rotation around the second geometric axis. Accordingly, and in some examples, the second actuator may be arranged on the supporting structure at an opposite position compared to the second pivot joint and aligns with the second geometric rotation axis.

In some examples, the second actuator may be arranged at a second actuator position of the supporting structure, wherein the power generating arrangement further comprises a second actuator bearing configured to suspend the supporting structure at the second actuator position. A technical advantage may be that the second actuator bearing can enable for a sufficient and improved rotational functionality of the power generator by the second actuator.

In some examples, the actuator arrangement may further comprise at least one rotation damper. A technical advantage may be that an increased rotational inertia is provided which can reduce the risk of undesirable power generator oscillations when e.g. the vehicle drives on a bumpy road surface.

In some examples, the rotation damper may be a rotation spring configured to control the rotation of the supporting structure. In some examples, the rotation damper may be a gas damper configured to control the rotation of the supporting structure.

In some examples, the actuator arrangement may be a hydraulic actuator arrangement.

In some examples, the actuator arrangement may be an electric actuator arrangement.

A hydraulic or electric actuator may be designed to enable for a rapidly adjustable actuator, such as to achieve a damping and spring constant to the system. Thus, it enables for active adjustment of the power generator arrangement when desired. This may be particularly advantageous for situations where an upcoming vibration situation is detected, where rapid actuator response can maintain the power generator arrangement is a substantial level position, i.e. the plane defined by the downward facing side can maintain substantially perpendicular to the direction of gravity. Accordingly, a hydraulic or electric actuator may be advantageously combined with predictive control via e.g. cameras, sensors, etc.

In some examples, the supporting structure may comprise a third pivot joint rotatable about a third geometric rotation axis, the third geometric axis being substantially perpendicular to the extension of the first and second geometric axes. A technical advantage may be that the power generator may be rotated when the vehicle is driven in operating conditions that has sudden rotations around a vertical rotation axis. This may be particularly advantageous for a power generating arrangement mounted to e.g. an excavator.

In some examples, the housing may be connected to the supporting structure such that the center of gravity of the power generator aligns with the third geometric axis.

In some examples, the power generating arrangement may further comprise at least one level sensor configured to detect an inclination of the vehicle. A technical advantage is that the level sensor may keep track of the position of the power generator relative a direction of gravity. Thus, rapid actions to maintain the power generator in a level position can be taken.

In some examples, the power generating arrangement may further comprise a control unit comprising a processor device configured to receive data from the at least one level sensor, the data being representative of an inclination of the vehicle, and in response to the inclination being non-perpendicular to a direction of gravity control the actuator arrangement to rotate the supporting structure to a position in which the first and second geometric rotation axes are arranged perpendicular to the direction of gravity. A technical advantage may be that a responsive action is taken to maintain the power generator at a desired position relative to the supporting structure.

In some examples, the power generating arrangement may further comprise a force sensor configured to detect acceleration forces of the vehicle. A technical advantage may be that an active levelling of the power generator can be obtained when detecting a sudden impact of the power generating arrangement. As an alternative, a pneumatic actuator may also be conceivable.

In some examples, the power generating arrangement may further comprise a topography detector operatively connected to the processor device, the topography detector being configured to detect a topography ahead of the vehicle. A technical advantage may be that precautionary actions can be taken for providing the power generator at a desired position before the vehicle arrives at the position ahead. The topography detector may, for example, be a GPS.

In some examples, the power generator may be a fuel cell comprising at least one fuel cell stack. A fuel cell may be particularly sensitive to inclined positioning. If a portion of the fuel cell is covered in water, the fuel cell may not be able to generate electric power. Further, water is more or less continuously produced by the fuel cell during operation, and a rotation of the fuel cell can negatively affect the drainage capability of the fuel cell. This may be particularly severe during transient operation of the fuel cell, i.e. when the need of power generation of the fuel cell can be crucial for properly feeding electric power to e.g. a high-voltage battery and/or an electric traction motor of the vehicle. The supporting structure may thus be particularly advantageous for a power generator in the form of a fuel cell.

In some examples, the outlet of the housing may be connected to an outlet of a cathode side of the fuel cell. A technical advantage may be that the produced water can be drained from the outlet of the cathode side and out through outlet of the housing.

According to a second aspect, there is provided a vehicle comprising the power generating arrangement according to any of the examples described above in relation to the first aspect. Effects and features of the second aspect are largely analogous to those described above in relation to the first aspect.

According to a third aspect, there is provided a method of controlling a power generating arrangement of a vehicle, the method comprising determining an inclination of the vehicle, and in response to the inclination being non-perpendicular to a direction of gravity rotating at least one of a first and second pivot joints of a supporting structure connected to a housing of the power generating arrangement such that a first geometric rotation axis about which the first pivot joint is rotatable, and a second geometric rotation axis about which the second pivot joint is rotatable, are arranged perpendicular to the direction of gravity.

According to an example embodiment, the method may further comprise transmitting the inclination and associated position on map data to an external server. A technical advantage may be that other vehicles operating the same route may be provided with the inclination and control their corresponding power generating arrangement accordingly when arriving at the associated position.

Further effects and features of the third aspect are largely analogous to those described above in relation to the first aspect.

According to a fourth aspect, there is provided a computer program product comprising program code for performing, when executed by the processor device, the method of any of the examples described above in relation to the third aspect.

According to a fifth aspect, there is provided a control system comprising one or more control units configured to perform the method according to any of the examples described above in relation to the third aspect.

According to a sixth aspect, there is provided a non-transitory computer-readable storage medium comprising instructions, which when executed by the processor device, cause the processor device to perform the method of any of the examples described above in relation to the third aspect.

Effects and features of the fourth, fifth and sixth aspects are largely analogous to those described above in relation to the first and third aspects.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

DETAILED DESCRIPTION

Aspects set forth below represent the necessary information to enable those skilled in the art to practice the disclosure.

The disclosure described in the following may keep the power generating arrangement in a substantially horizontal position irrespective of an inclination of the vehicle to which the power generating arrangement is mounted. A technical benefit may include that any potential fluid arranged in the power generator is maintained at a bottom side, thereby reducing the risk of soaking components of the power generator that may be sensitive to interaction with fluids.

Figure 1:
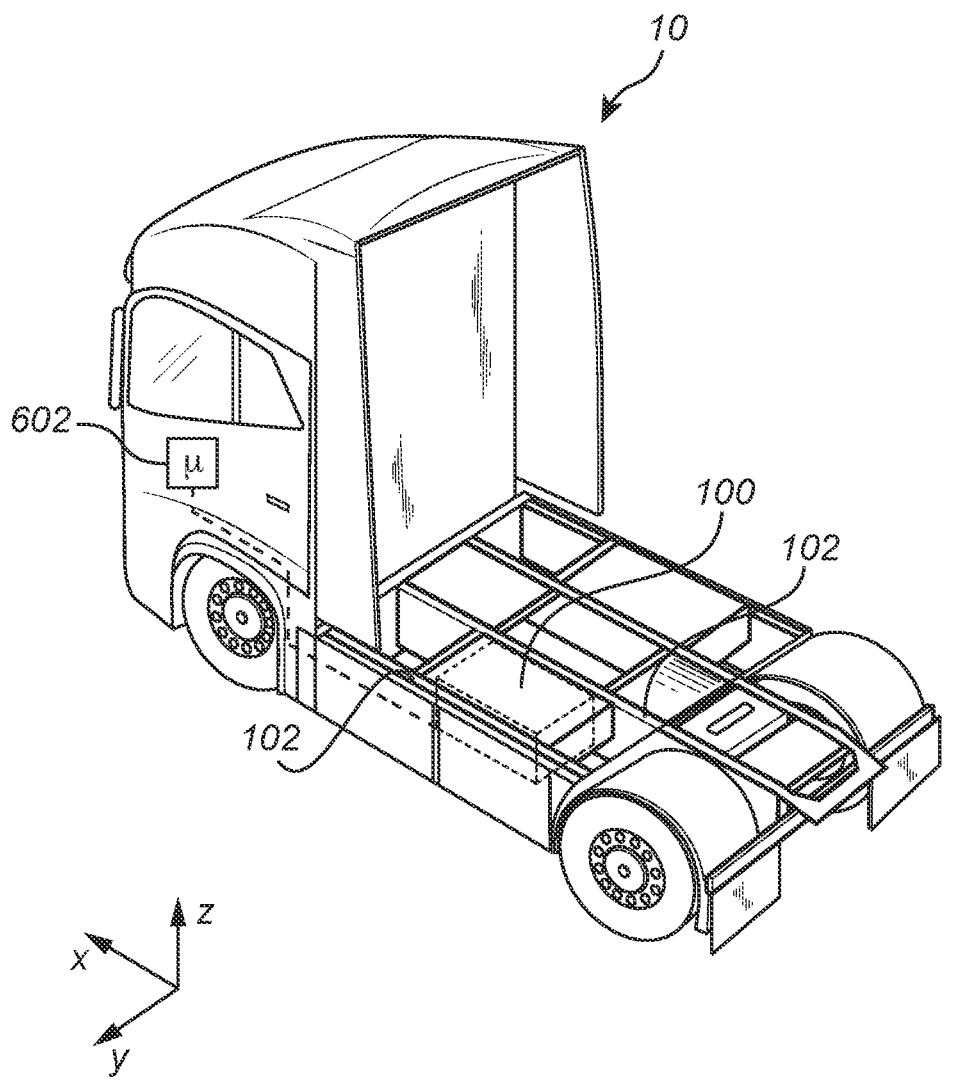
FIG. 1 is an exemplary illustration of a vehicle according to one example.

Turning to FIG. 1 which is an exemplary illustration of a vehicle 10 according to one example. The vehicle 10 is depicted as a towing truck at which one or more trailers are connectable. Although the following will be described in relation to the vehicle 10 in the form of a truck, it should be readily understood that the disclosure described below is applicable also for other types of vehicles, such as working machines, buses, passenger cars, and even piston slope machines also referred to as snow groomers.

The vehicle 10 comprises a power generating arrangement 100 and a control unit 602, also referred to as a processor device 602, connected to the power generating arrangement 100 for controlling operation thereof. The power generator arrangement 100 is connected to a frame structure 102 of the vehicle 10 which is described in further detail below. The power generator arrangement 100 comprises a power generator 104 configured to generate power. As an example, the power generator 104 is a fuel cell comprising at least one fuel cell stack. The fuel cell is configured to generate electric power by receiving e.g. oxygen from ambient air and a hydrogen gas. The electric power generated by the fuel cell can be fed to e.g. one or more electric traction motors (not shown) of the vehicle 10 or to an energy storage system (not shown) of the vehicle, which energy storage system is preferably a high-voltage battery. As can also be seen in FIG. 1, the vehicle 10 is defined in a coordinate system where the x-axis corresponds to the longitudinal extension of the vehicle, the y-axis corresponds to the transversal direction of the vehicle, and the z-axis corresponds to the vertical direction of the vehicle.

Figure 2:
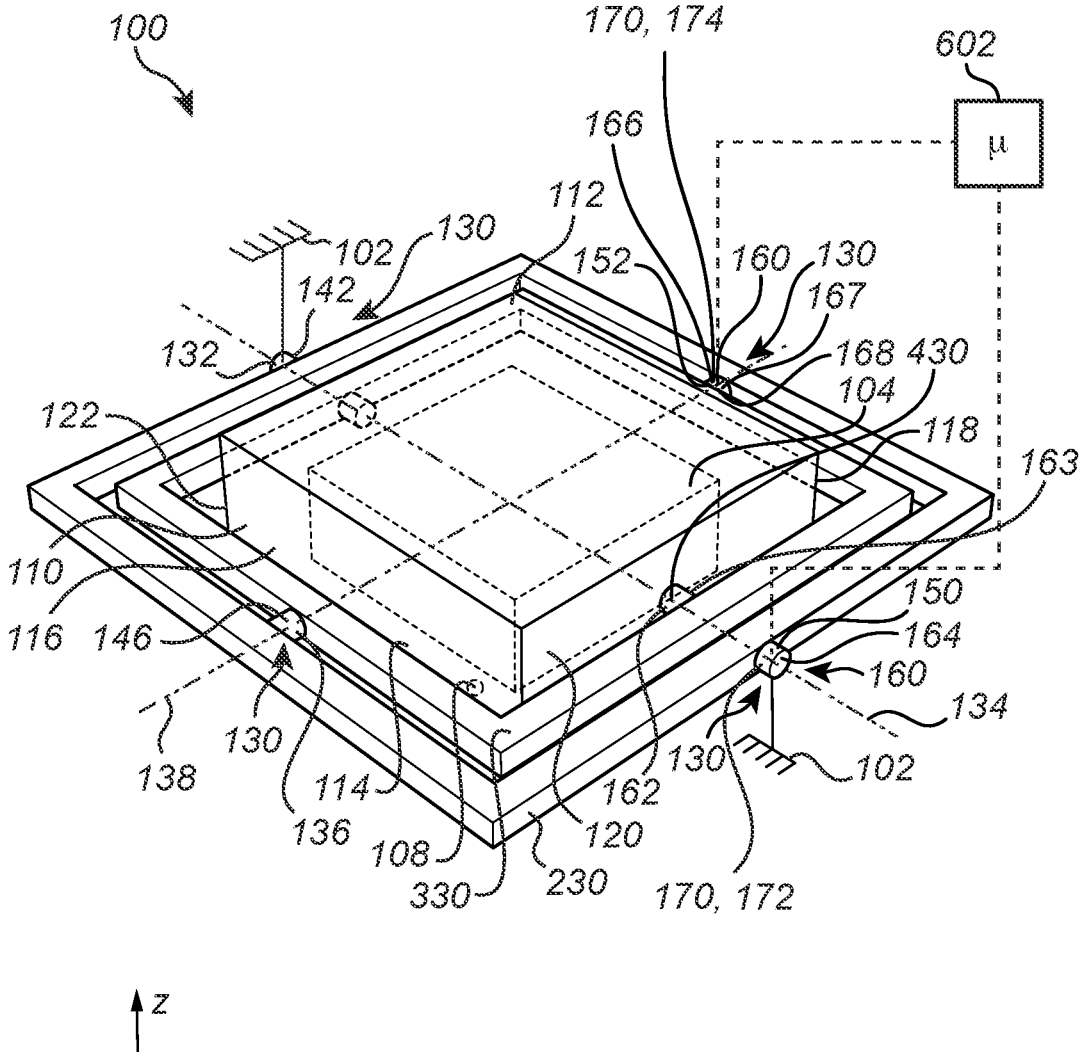
FIG. 2 is an exemplary perspective illustration of a power generating arrangement according to one example.
Figure 3:
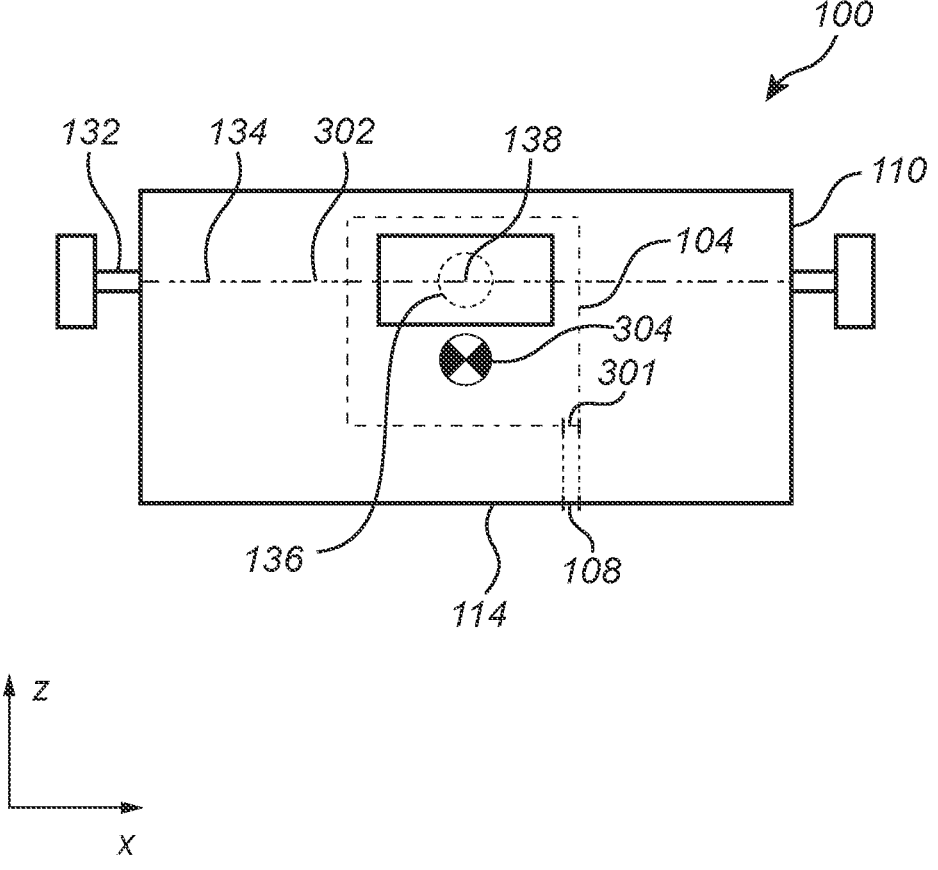
FIG. 3 is an exemplary side view of a power generating arrangement according to one example.

In order to describe the power generating arrangement 100 in further detail, reference is now made to FIG. 2, which is an exemplary perspective illustration of the power generating arrangement 100 according to one example. As described above, the power generator arrangement 100 comprises a power generator 104. The power generator 104 is schematically illustrated and will in the following be exemplified as a fuel cell. It should be readily understood that the components of the exemplified power generator arrangement in FIG. 2 should not be construed as being to scale, but rather that the FIG. 2 illustration serves as an example for simplifying the understanding of the interaction and functions of the various components of the disclosure as will be described in the following. Although not depicted, the fuel cell 104 contains a fluid. The fluid can be in liquid, humid and/or moisturized form. Thus, there may be a relatively high humidity in the fuel cell stack but liquid fluid should preferably not be standing inside the fuel cell 104 to avoid damage of components and to keep an operational capacity of the fuel cell as high as possible. In a fuel cell, liquid fluid in the form of water is continuously produced. The water is preferably drained through an outlet 108 of a housing 110 in which the fuel cell 104 is arranged, which is illustrated in FIG. 3. The power generator arrangement 100 thus comprises the housing 110. The outlet 108 of the housing 110 is thus preferably connected to an outlet of a cathode side of the fuel cell 104.

The housing 110 comprises an upward facing side 112 and a downward facing side 114. The upward facing side 112 is thus arranged vertically above the downward facing side 114 in relation to an upward direction of the coordinate system, i.e. in the z-direction. The outlet 108 described above is thus arranged at the downward facing side 114. The housing 110 further comprises a front side 116 and a rear side 118 as seen in a forward direction of the coordinate system, i.e. in the x-direction. Also, the housing comprises a first lateral side 120 and a second lateral side 122, where the first 120 and second 122 lateral sides are opposite lateral sides of the housing 110 as seen in the lateral direction of the coordinate system, i.e. in the y-direction.

The power generating arrangement 100 further comprising a supporting structure 130 configured to support the housing 110 to the frame structure 102. Put it differently, the supporting structure 130 rotatably connects the housing 110 to the frame structure 102, in FIG. 2 schematically depicted as a mechanical ground. Preferably, and as exemplified in FIG. 2, the supporting structure 130 comprises a first supporting portion 230 and a second supporting portion 330. The first supporting portion 230 encloses the second supporting portion 330. As can be seen in FIG. 2, the supporting structure 130 comprises a first pivot joint 132 exemplified as connecting the supporting structure 130 to the frame structure 102. In further detail, the first pivot joint 132 rotatably connects the first supporting portion 230 to the frame structure 102. The first pivot joint 132 is rotatable about a first geometric rotation axis 134, which first rotation axis 134 is exemplified as extending in same direction as the y-axis of the coordinate system, i.e. in the lateral direction.

The supporting structure 130 also comprises a second pivot joint 136 exemplified as rotatably connecting the first supporting portion 230 to the second supporting portion 330. The second pivot joint 136 is rotatable about a second geometric rotation axis 138, which second rotation axis 138 is exemplified as extending in same direction as the x-axis of the coordinate system, i.e. in the longitudinal direction.

Further, the supporting structure 130 also comprises a housing pivot joint 430. The housing pivot joint 430 is exemplified as rotatably connecting the housing 110 to the second supporting portion 330. The housing pivot joint 430 is rotatable about the first geometric rotation axis 134 described above.

In the exemplified power generating arrangement 100 depicted in FIG. 2, the first 134 and second 138 geometric rotation axes are non-parallel to each other. Preferably, the extension of the first geometric rotation axis 134 is perpendicular to the extension of the second geometric rotation axis 138. As will be exemplified and described below with reference to FIG. 3, a center of gravity of the power generator 104 is arranged between at least one of the first 134 and second 138 geometric rotation axes and the downward facing side 114 of the housing 110.

Moreover, the first pivot joint 132 comprises a first bearing 142 and the second pivot joint 136 comprises a second bearing 146. The first 142 and second 146 bearings enable for an improved rotation about the first 134 and second 138 rotation axes, respectively.

Furthermore, the exemplified power generating arrangement 100 may also comprise a third pivot joint 150 and a fourth pivot joint 152. The third pivot joint 150 is arranged on the first supporting portion 230, and connects the first supporting portion to the frame structure 102.

In further detail, the third pivot joint 130 rotatably connects the first supporting portion 230 to the frame structure 102. The third pivot joint 150 is rotatable about the above described first geometric rotation axis 134. The first 132 and third 150 pivot joints are thus arranged on opposite positions of the first supporting portion 230 as seen in the lateral direction.

The fourth pivot joint 152 rotatably connects the second supporting portion 330 to the first supporting portion 230. The fourth pivot joint 152 is rotatable about the above described second geometric rotation axis 138. The second 136 and fourth 152 pivot joints are thus arranged on opposite positions of the second supporting portion 330 as seen in the longitudinal direction.

The power generator arrangement 100 may also advantageously comprise an actuator arrangement 160. The actuator arrangement 160 is configured to control a rotation of the supporting structure about at least one of the first 134 and second 138 geometric rotation axes. As depicted in FIG. 2, the actuator arrangement 160 is connected to the processor device 602, and is thus configured to receive data from processor device 602 to control operation of the actuator arrangement 160. According to non-limiting examples, the actuator arrangement may be one of a hydraulic actuator arrangement comprising a hydraulic motor for controlling rotation, or an electric actuator arrangement comprising an electric motor for controlling rotation. As a still further alternative, the actuator arrangement may be a pneumatic actuator receiving pressurized air from a source of pressurized air of the vehicle.

In yet further detail, the actuator arrangement 160 may comprise a first actuator 162. The first actuator 162 is configured to control a rotation of the housing 110 about the first geometric rotation axis 134. Hence, the first actuator 162 is able to rotate the housing 110 relative to the frame structure 102 about the first geometric rotation axis 134. As exemplified in FIG. 2, the first actuator 162 is arranged on the supporting structure 130 at an opposite side of the housing 110, i.e. at a first actuator position 163, compared to the first pivot joint 132 and aligns with the first geometric rotation axis 134. In detail, the exemplified first actuator 162 is arranged at the housing pivot joint 430. In yet further detail, the first actuator 162 arranged between the housing 110 and the second supporting portion 330 and configured to actively provide a rotation of the housing about the first geometric rotation axis 134.

Furthermore, the power generating arrangement 100 also comprises a first actuator bearing 164 configured to suspend the supporting structure at the first actuator position 163.

As also exemplified in FIG. 2, the actuator arrangement 160 further comprises a second actuator 166. The second actuator 166 is configured to control a rotation of the supporting structure 130 about the second geometric axis 138. Hence, the second actuator 166 is able to rotate the housing 110 relative to the frame structure 102 about the second geometric rotation axis 138. As exemplified in FIG. 2, the second actuator 166 is arranged on the supporting structure 130 at an opposite position, i.e. at a second actuator position 167, compared to the second pivot joint 136 and aligns with the second geometric rotation axis 138. In detail, the exemplified second actuator is arranged at the fourth pivot joint 152. In yet further detail, the second actuator 166 is arranged to rotate the second supporting portion 330 relative to the first supporting portion 230, i.e. to rotate the housing 110 relative to the frame structure of the vehicle 102 about the second geometric rotation axis 138.

Furthermore, the power generating arrangement 100 also comprises a second actuator bearing 168 configured to suspend the supporting structure at the second actuator position 167.

Moreover, the exemplified actuator arrangement 160 preferably comprises at least one rotation damper 170. The first actuator 162 of the actuator arrangement 160 is exemplified in FIG. 2 as comprising a first rotation damper 172, while the second actuator 166 of the actuator arrangement 160 is exemplified as comprising a second rotation damper 174. The rotation damper 170, i.e. the first 172 and second 174 rotation damper, is configured to control the rotation of the supporting structure. Thus, excessive swing-out of the supporting structure can be suppressed by means of the rotation damper 170. The rotation damper may be a rotation spring, or a gas damper.

Reference is now made to FIG. 3, which is an exemplary side view of a power generating arrangement 100 according to one example. As can be seen in FIG. 3, the first 134 and second 138 geometric rotation axes define a geometric plane 302. The geometric plane 302 is in FIG. 3 arranged in parallel with a geometric plane defined by the x- and y-axes of the coordinate system. The center of gravity 304 of the power generator arrangement 100 is arranged between the geometric plane 302 and the downward facing side 114 of the housing 110. Put it differently, the center of gravity 304 of the power generator arrangement 100 is arranged below the geometric plane 302 as seen in the vertical direction of the vehicle, i.e. as seen in the z-direction of the coordinate system. FIG. 3 also exemplifies the outlet 108 of the housing 110. The outlet 108 is connected to an outlet 301 of a cathode side of the fuel cell 104.

Figure 4:
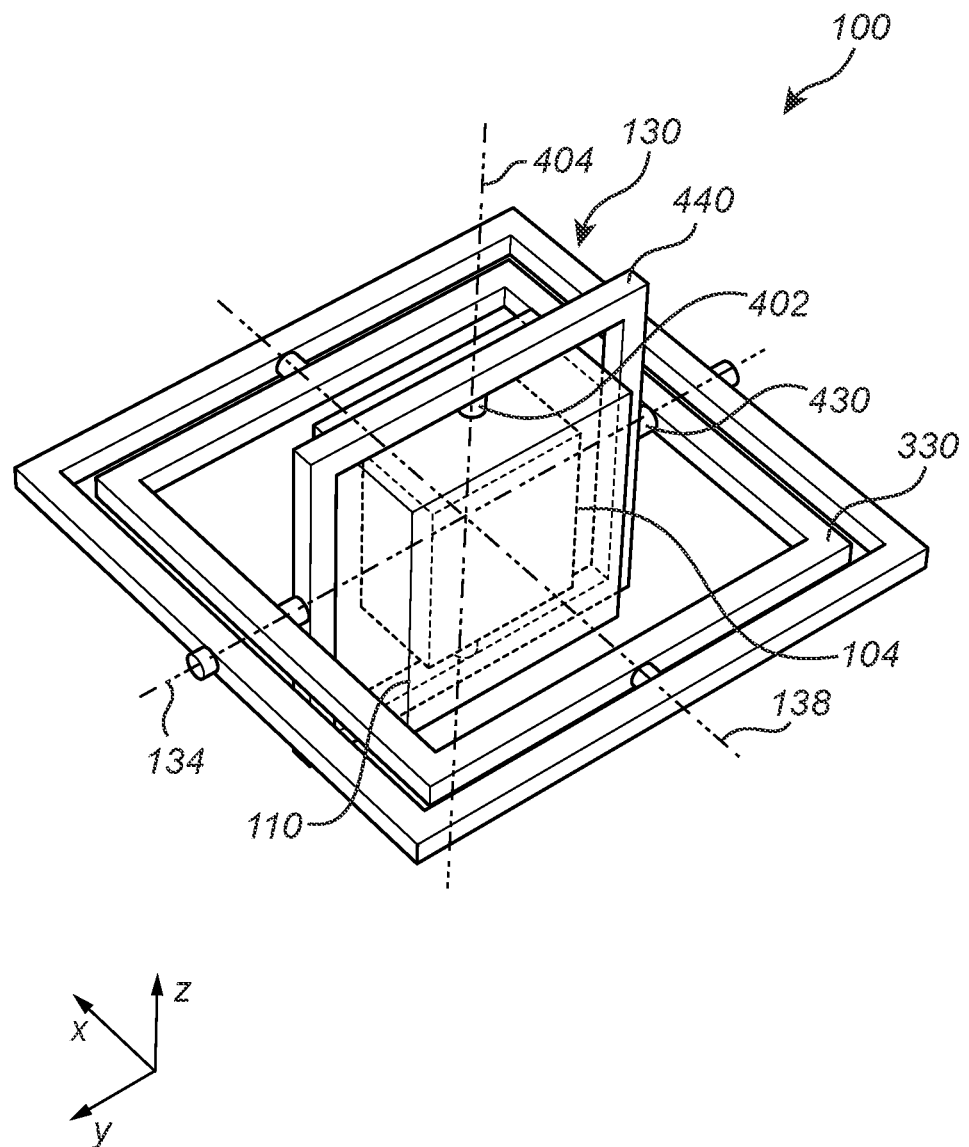
FIG. 4 is an exemplary perspective illustration of a power generating arrangement according to one example.

Turning now to FIG. 4, which is an exemplary perspective illustration of a power generating arrangement according to one example. The power generating arrangement 100 described below with reference to FIG. 4 comprises the same features as the power generating arrangement 100 described above in relation to FIG. 2, and thus only the added features of the FIG. 4 example will be described in the following.

The exemplified power generating arrangement 100 of FIG. 4 comprises a supporting structure 130 in a similar vein as the FIG. 2 example. In addition, the supporting structure 130 comprises a third supporting portion 440 arranged inside the second supporting portion 330. The third supporting portion 440 is rotatably connected to the supporting portion 330 by the housing pivot joint 430. The supporting structure 130 also comprises a third pivot joint 402. The third pivot joint 402 is rotatable about a third geometric rotation axis 404 which is substantially perpendicular to the extension of the first 134 and second 138 geometric axes. The third geometric rotation axis 404 is thus preferably parallel with the vertical axis of the vehicle, i.e. the z-axis of the coordinate system. The third pivot joint 402 is preferably rotatably connecting the housing 110 to the third supporting portion 440. Preferably, the housing 110 is connected to the third supporting portion 440 such that the center of gravity of the power generator aligns with the third geometric axis 404.

The third pivot joint 402 may also comprise an actuator connected to the processor device in a similar vein as described above in relation to the description of FIG. 2, as well as a rotation damper.

The power generating arrangement 100 described above in relation to FIGS. 2-4 may also comprise at least one level sensor which is configured to detect an inclination of the vehicle. Such level sensor is preferably operatively connected to the processor device 602 to transmit data indicative of an inclination of the vehicle 10. In response to the inclination of the vehicle being non-perpendicular to a direction of gravity, i.e. the z-direction of the vehicle is non-parallel with the direction of gravity, the processing circuitry may transmit data to the actuator arrangement, which data instructs the actuator arrangement to rotate the housing to a position such that the first and second geometric rotation axes are arranged perpendicular to the direction of gravity.

The power generating arrangement may also comprise a force sensor which is configured to detect acceleration forces of the vehicle. Hereby, if e.g. the vehicle bumps into an obstacle, the force sensor can transmit data to the processor device 602, which in turn controls the actuator arrangement to rotate the housing to a position such that the first and second geometric rotation axes are arranged perpendicular to the direction of gravity.

Also, the power generating arrangement may further comprise a topography detector operatively connected to the processor device, the topography detector being configured to detect a topography ahead of the vehicle. The processor device may hereby control actuator arrangement before arriving at e.g. an upward sloping road surface.

The above described actuator arrangement may be particularly advantageous for levelling purposes of the power generating arrangement 100, especially when combined with sensors, cameras or a vehicle steering system coupled to the processor device 602. In particular, the actuator arrangement may control a rotation of the housing 110 based on a signal indicating that the vehicle will turn to the left or to the right. In such situation, the actuator arrangement can receive a signal in advance of such vehicle motion and actively control the rotation of the housing to maintain the housing, and in turn the power generator, in a level position.

Further, by using an actuator arrangement combined with cameras, a feed forward control of the power generating arrangement is possible. Hereby, a prediction can be made of an upcoming bumpy operating condition, and the resulting upcoming sudden motion of the power generator can be dampened. For example, a camera may predict that a bucket of a digger/excavator is forced into a pile of soil. The actuator arrangement may in such situation control damping of the housing 110 to thereby reduce the upcoming pendulum motion. Hence, the amplitude as well as the duration of the pendulum motion can in such situation be reduced.

Figure 5:
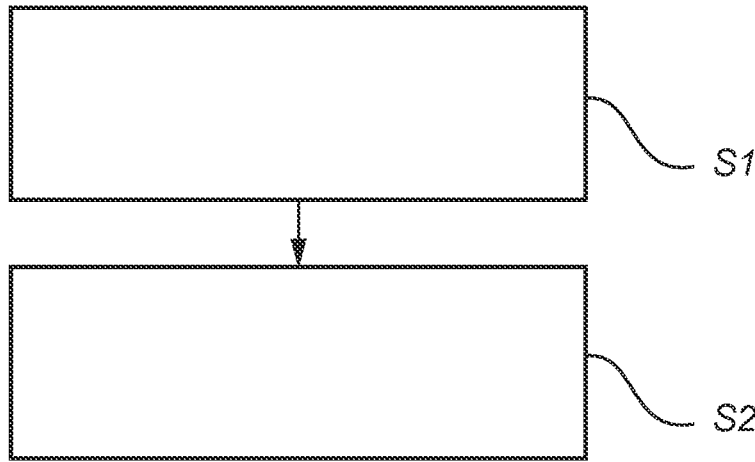
FIG. 5 is an exemplary flow chart of a method of controlling a power generating arrangement according to one example.

Turning now to FIG. 5 which is an exemplary flow chart of a method of controlling the power generating arrangement 100 according to one example. During operation, an inclination of the vehicle 10 is determined S1. At least one of the first and second pivot joints of a supporting structure connected to a housing of the power generator is rotated S2 in response to the inclination being non-perpendicular to a direction of gravity. By the rotation, the first geometric rotation axis 134 and a second geometric rotation axis 138 are hereby arranged perpendicular to the direction of gravity.

Figure 6:
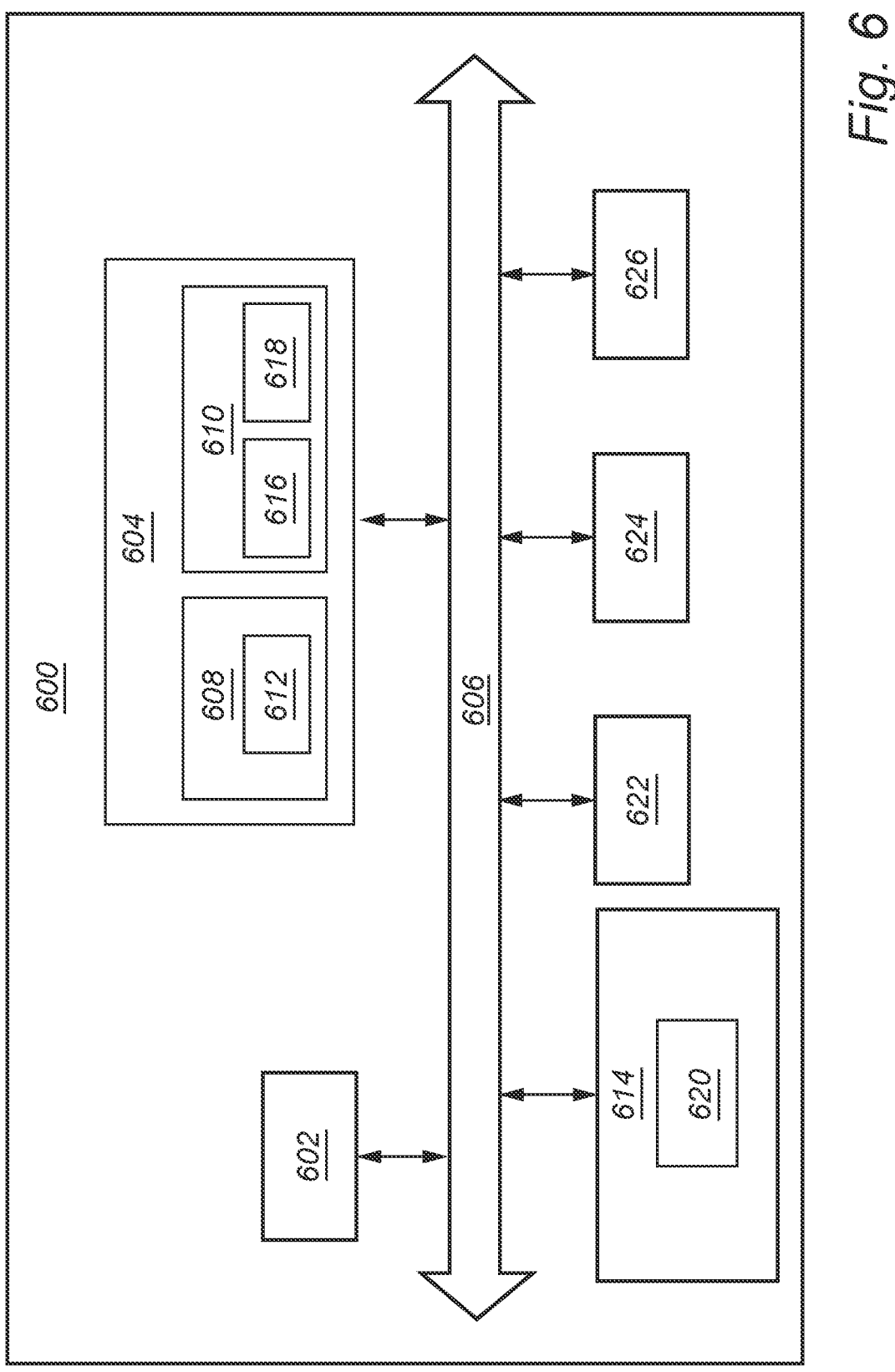
FIG. 6 is a schematic diagram of an exemplary computer system for implementing examples disclosed herein, according to one example.

Turning now to FIG. 6 is a schematic diagram of a computer system 600 for implementing examples disclosed herein. The computer system 600 is adapted to execute instructions from a computer-readable medium to perform these and/or any of the functions or processing described herein. The computer system 600 may be connected (e.g., networked) to other machines in a LAN, an intranet, an extranet, or the Internet. While only a single device is illustrated, the computer system 600 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 600 may comprise at least one computing device or electronic device capable of including firmware, hardware, and/or executing software instructions to implement the functionality described herein. The computer system 600 may include a processor device 602 (may also be referred to as a control unit), a memory 604, and a system bus 606. The computer system 600 may include at least one computing device having the processor device 602. The system bus 606 provides an interface for system components including, but not limited to, the memory 604 and the processor device 602. The processor device 602 may include any number of hardware components for conducting data or signal processing or for executing computer code stored in memory 604. The processor device 602 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 606 may be any of several types of bus structures that may further interconnect to a memory bus (with or without a memory controller), a peripheral bus, and/or a local bus using any of a variety of bus architectures. The memory 604 may be one or more devices for storing data and/or computer code for completing or facilitating methods described herein. The memory 604 may include database components, object code components, script components, or other types of information structure for supporting the various activities herein. Any distributed or local memory device may be utilized with the systems and methods of this description. The memory 604 may be communicably connected to the processor device 602 (e.g., via a circuit or any other wired, wireless, or network connection) and may include computer code for executing one or more processes described herein. The memory 604 may include non-volatile memory 608 (e.g., read-only memory (ROM), erasable programmable read-only memory (EPROM), electrically erasable programmable read-only memory (EEPROM), etc.), and volatile memory 610 (e.g., random-access memory (RAM)), or any other medium which can be used to carry or store desired program code in the form of machine-executable instructions or data structures and which can be accessed by a computer or other machine with a processor device 602. A basic input/output system (BIOS) 612 may be stored in the non-volatile memory 608 and can include the basic routines that help to transfer information between elements within the computer system 600.

The computer system 600 may further include or be coupled to a non-transitory computer-readable storage medium such as the storage device 614, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 614 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 614 and/or in the volatile memory 610, which may include an operating system 616 and/or one or more program modules 618. All or a portion of the examples disclosed herein may be implemented as a computer program product 620 stored on a transitory or non-transitory computer-usable or computer-readable storage medium (e.g., single medium or multiple media), such as the storage device 614, which includes complex programming instructions (e.g., complex computer-readable program code) to cause the processor device 602 to carry out the steps described herein. Thus, the computer-readable program code can comprise software instructions for implementing the functionality of the examples described herein when executed by the processor device 602. The processor device 602 may serve as a controller or control system for the computer system 600 that is to implement the functionality described herein.

The computer system 600 also may include an input device interface 622 (e.g., input device interface and/or output device interface). The input device interface 622 may be configured to receive input and selections to be communicated to the computer system 600 when executing instructions, such as from a keyboard, mouse, touch-sensitive surface, etc. Such input devices may be connected to the processor device 602 through the input device interface 622 coupled to the system bus 606 but can be connected through other interfaces such as a parallel port, an Institute of Electrical and Electronic Engineers (IEEE) 1394 serial port, a Universal Serial Bus (USB) port, an IR interface, and the like. The computer system 600 may include an output device interface 624 configured to forward output, such as to a display, a video display unit (e.g., a liquid crystal display (LCD) or a cathode ray tube (CRT)). The computer system 600 may also include a communications interface 626 suitable for communicating with a network as appropriate or desired.

EXAMPLE LIST

Example 1

A power generating arrangement for a vehicle, the power generating arrangement comprising:

a power generator configured to contain a fluid in liquid, humid and/or moisturized form, a housing comprising an upward facing side and a downward facing side, wherein the power generator is arranged in the housing, the housing comprising an outlet configured to drain the fluid, wherein the outlet is arranged at the downward facing side, and a supporting structure comprising a first pivot joint rotatable about a first geometric rotation axis, and a second pivot joint rotatable about a second geometric rotation axis, wherein the first and second geometric rotation axes are non-parallel to each other, the supporting structure being connectable to a frame structure of the vehicle at the first pivot joint, wherein the housing is rotatably connected to the supporting structure, and wherein a center of gravity of the power generator is arranged between at least one of the first and second geometric rotation axes and the downward facing side of the housing.

Example 2

The power generating arrangement of example 1, wherein the first and second geometric rotation axes define a geometric plane, the center of gravity of the power generator arrangement being arranged between the geometric plane and the downward facing side of the housing.

Example 3

The power generating arrangement of examples 1 or 2, wherein the supporting structure comprises a first supporting portion and a second supporting portion, the second supporting portion being arranged between the housing and the first supporting portion.

Example 4

The power generating arrangement of example 3, wherein the first pivot joint is arranged on the first supporting portion, such that the first supporting portion is rotatably connectable to the frame structure of the vehicle.

Example 5

The power generator arrangement of examples 3 or 4, wherein the second pivot joint rotatably connects the second supporting portion to the first supporting portion about the second geometric rotation axis.

Example 6

The power generator arrangement of any one of examples 3-5, wherein the housing is rotatably connected to the second supporting portion about the first geometric rotation axis.

Example 7

The power generating arrangement of any one of the preceding examples, wherein the first pivot joint comprises a first bearing and the second pivot joint comprises a second bearing.

Example 8

The power generating arrangement of any one of the preceding examples, wherein the power generating arrangement further comprises an actuator arrangement configured to control a rotation of the supporting structure about at least one of the first and second geometric rotation axes.

Example 9

The power generating arrangement of example 8, wherein the actuator arrangement comprises a first actuator configured to control a rotation of the supporting structure about the first geometric rotation axis.

Example 10

The power generating arrangement of example 9, wherein the first actuator is arranged on the supporting structure at an opposite position compared to the first pivot joint and aligns with the first geometric rotation axis.

Example 11

The power generating arrangement of any one of examples 9 or 10, wherein the first actuator is arranged at a first actuator position of the supporting structure, wherein the power generating arrangement further comprises a first actuator bearing configured to suspend the supporting structure at the first actuator position.

Example 12

The power generator arrangement of any one of examples 8-11, wherein the actuator arrangement comprises a second actuator configured to control a rotation of the supporting structure about the second geometric axis.

Example 13

The power generating arrangement of example 12, wherein the second actuator is arranged on the supporting structure at an opposite position compared to the second pivot joint and aligns with the second geometric rotation axis.

Example 14

The power generating arrangement of any one of examples 12 or 13, wherein the second actuator is arranged at a second actuator position of the supporting structure, wherein the power generating arrangement further comprises a second actuator bearing configured to suspend the supporting structure at the second actuator position.

Example 15

The power generating arrangement of any one of examples 8-14, wherein the actuator arrangement further comprises at least one rotation damper.

Example 16

The power generating arrangement of example 15, wherein the rotation damper is a rotation spring configured to control the rotation of the supporting structure.

Example 17

The power generating arrangement of example 15, wherein the rotation damper is a gas damper configured to control the rotation of the supporting structure.

Example 18

The power generating arrangement of any one of examples 8-17, wherein the actuator arrangement is a hydraulic actuator arrangement.

Example 19

The power generating arrangement of any one of examples 8-17, wherein the actuator arrangement is an electric actuator arrangement.

Example 20

The power generating arrangement of any one of the preceding examples, wherein the supporting structure comprises a third pivot joint rotatable about a third geometric rotation axis, the third geometric axis being substantially perpendicular to the extension of the first and second geometric axes.

Example 21

The power generating arrangement of example 20, wherein the housing is connected to the supporting structure such that the center of gravity of the power generator aligns with the third geometric axis.

Example 22

The power generating arrangement according to any one of the preceding examples, wherein the power generating arrangement further comprises at least one level sensor configured to detect an inclination of the vehicle.

Example 23

The power generating arrangement according to example 22 when dependent on any one of examples 8-19, wherein the power generating arrangement further comprises a control unit comprising a processor device configured to:
  receive data from the at least one level sensor, the data being representative of an inclination of the vehicle, and in response to the inclination being non-perpendicular to a direction of gravity
  control the actuator arrangement to rotate the supporting structure to a position in which the first and second geometric rotation axes are arranged perpendicular to the direction of gravity.

Example 24

The power generating arrangement according to any one of the preceding examples, wherein the power generating arrangement further comprises a force sensor configured to detect acceleration forces of the vehicle.

Example 25

The power generating arrangement according to any one of the preceding examples, wherein the power generating arrangement further comprises a topography detector operatively connected to the processor device, the topography detector being configured to detect a topography ahead of the vehicle.

Example 26

The power generating arrangement according to any one of the preceding examples, wherein the power generator is a fuel cell comprising at least one fuel cell stack.

Example 27

The power generating arrangement according to example 26, wherein the outlet of the housing is connected to an outlet of a cathode side of the fuel cell.

Example 28

A vehicle comprising the power generating arrangement according to any of the preceding examples.

Example 29

A method of controlling a power generating arrangement of a vehicle, the method comprising:
  determining an inclination of the vehicle, and in response to the inclination being non-perpendicular to a direction of gravity
  rotating at least one of a first and second pivot joints of a supporting structure connected to a housing of the power generating arrangement such that a first geometric rotation axis about which the first pivot joint is rotatable, and a second geometric rotation axis about which the second pivot joint is rotatable, are arranged perpendicular to the direction of gravity.

Example 30

The method of example 29, further comprising:
  transmitting the inclination and associated position on map data to an external server.

Example 31

A computer program product comprising program code for performing, when executed by the processor device, the method of any of examples 29-30.

Example 32

A control system comprising one or more control units configured to perform the method according to any of examples 29-30.

Example 33

A non-transitory computer-readable storage medium comprising instructions, which when executed by the processor device, cause the processor device to perform the method of any of examples 29-30.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosures being set forth in the following claims.

The invention claimed is:

1. A power generating arrangement for a vehicle, the power generating arrangement comprising:
   a power generator configured to contain a fluid in liquid, humid and/or moisturized form,
   a housing comprising an upward facing side and a downward facing side, wherein the power generator is arranged in the housing, the housing comprising an outlet configured to drain the fluid, wherein the outlet is arranged at the downward facing side, and
   a supporting structure comprising a first pivot joint rotatable about a first geometric rotation axis, and a second pivot joint rotatable about a second geometric rotation axis, wherein the first and second geometric rotation axes are non-parallel to each other, the supporting structure being connectable to a frame structure of the vehicle at the first pivot joint,
wherein the housing is rotatably connected to the supporting structure, and wherein a center of gravity of the power generator is arranged between at least one of the first and second geometric rotation axes and the downward facing side of the housing.

2. The power generating arrangement of claim 1, wherein the first and second geometric rotation axes define a geometric plane, the center of gravity of the power generator arrangement being arranged between the geometric plane and the downward facing side of the housing.

3. The power generating arrangement of claim 1, wherein the supporting structure comprises a first supporting portion and a second supporting portion, the second supporting portion being arranged between the housing and the first supporting portion.

4. The power generating arrangement of claim 3, wherein the first pivot joint is arranged on the first supporting portion, such that the first supporting portion is rotatably connectable to the frame structure of the vehicle.

5. The power generator arrangement of claim 3, wherein the second pivot joint rotatably connects the second supporting portion to the first supporting portion about the second geometric rotation axis.

6. The power generating arrangement of claim 1, wherein the power generating arrangement further comprises an actuator arrangement configured to control a rotation of the supporting structure about at least one of the first and second geometric rotation axes.

7. The power generating arrangement of claim 6, wherein the actuator arrangement comprises a first actuator configured to control a rotation of the supporting structure about the first geometric rotation axis.

8. The power generator arrangement of claim 6, wherein the actuator arrangement comprises a second actuator configured to control a rotation of the supporting structure about the second geometric axis.

9. The power generating arrangement of claim 1, wherein the supporting structure comprises a third pivot joint rotatable about a third geometric rotation axis, the third geometric axis being substantially perpendicular to the extension of the first and second geometric axes.

10. The power generating arrangement according to claim 1, wherein the power generator is a fuel cell comprising at least one fuel cell stack.

11. A vehicle comprising the power generating arrangement according to claim 1.

12. A method of controlling a power generating arrangement of a vehicle, the method comprising:
    determining an inclination of the vehicle, and in response to the inclination being non-perpendicular to a direction of gravity,
    rotating at least one of a first and second pivot joints of a supporting structure connected to a housing of the power generating arrangement such that a first geometric rotation axis about which the first pivot joint is rotatable, and a second geometric rotation axis about which the second pivot joint is rotatable, are arranged perpendicular to the direction of gravity.

13. A control system comprising one or more control units configured to perform the method according to claim 12.

14. A non-transitory computer-readable storage medium comprising instructions, which when executed by the processor device, cause the processor device to perform the method of claim 12.

* * * * *